Dec. 7, 1926. 1,609,510
G. W. ENO
VULCANIZING APPARATUS
Original Filed Jan. 17, 1922
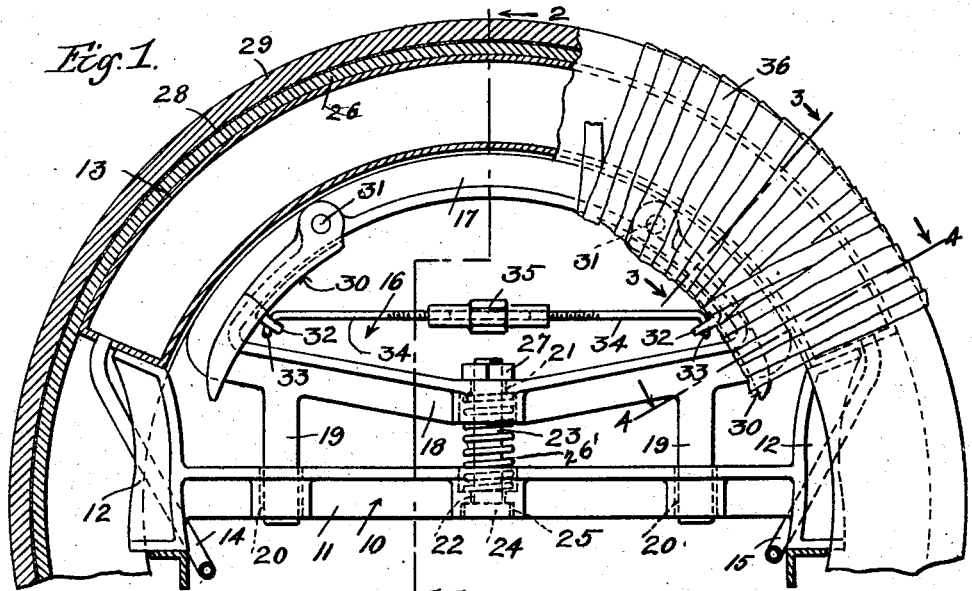
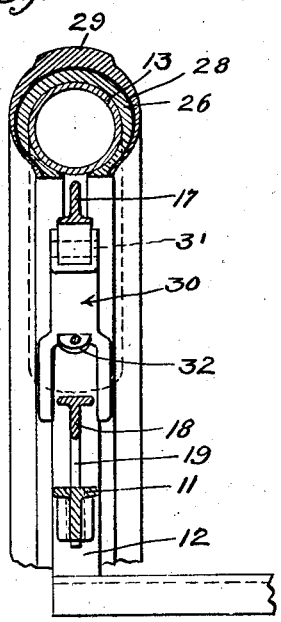
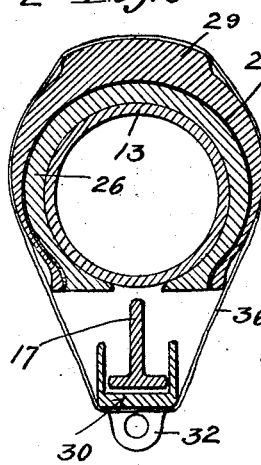
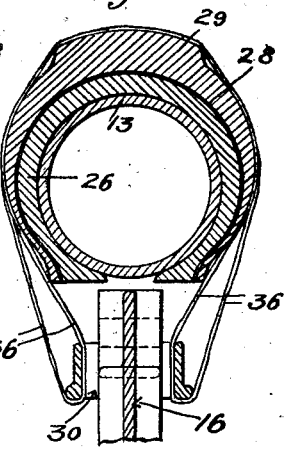
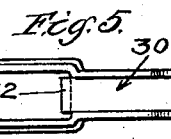
Inventor
by George W. Eno Patented Dec. 7, 1926.

1,609,510

UNITED STATES PATENT OFFICE.

GEORGE W. ENO, OF LOS ANGELES, CALIFORNIA, ASSIGNOR TO GEORGE W. ENO RUBBER COMPANY, OF LOS ANGELES, CALIFORNIA, A CORPORATION OF CALIFORNIA.

VULCANIZING APPARATUS.

Application filed January 17, 1922, Serial No. 529,868. Renewed May 8, 1926.

My invention relates to vulcanizing apparatus and is particularly adapted for the vulcanizing of "retreads" to the worn carcasses of pneumatic vehicle tires.

In apparatus for the above mentioned purpose it has been the practice to provide a segmental hollow mandrel into which steam is admitted and over which the used carcass which has been previously stripped of the old tread rubber is mounted, then to place the retread over the carcass having a suitable layer of cement and sheet cushion gum interposed between the abutting surfaces, then to wrap a tape or other binder around the outer surface of the retread and a segmental pressure member arranged adjacent the inner peripheral surface of said mandrel, then to adjust the segmental member radially to exert an even pressure through the medium of the binding tape to securely hold the retread to the carcass during the vulcanizing process.

By the use of the above described apparatus it has only been possible to vulcanize about one-sixth of a retread to a tire carcass at one time, mainly for the reason that the segmental pressure member did not exert an even uniform pressure on the retread throughout the entire length of the hollow mandrel.

It is the object of my present invention to provide a device that will exert an even and uniform pressure on the retread and tire carcass throughout the entire length of the hollow mandrel, thus rendering it possible to vulcanize at least one-third of the circumferential length of the retread to the carcass in a single operation, and consequently materially reducing the expense attendant upon such an operation.

The above and other objects will be more fully disclosed in the following description and will be embodied in th accompanying drawings, in which:

Fig. 1 is a view partially in side elevation and partially in section showing the application of my invention.

Fig. 2 is a transverse section through the same taken on the line 2—2 of Fig. 1.

Fig. 3 is an enlarged transverse section taken on the line 3—3 of Fig. 1.

Fig. 4 is an enlarged transverse section taken on the line 4—4 of Fig. 1.

Fig. 5 is a detail face view of one of the auxiliary tightening members.

In carrying out my invention 10 represents a suitable frame comprising the horizontally disposed bar 11 having the oppositely disposed upwardly extending members 12 formed on its ends, the lower extremities of which are secured to transversely disposed angle irons which are rigidly supported in any suitable manner. To the upper ends of members 12 is secured the hollow segmental mandrel 13 which is preferably circular in cross section and into which steam, for the purpose of heating the same, may be admitted and exhausted through the pipes 14 and 15.

Mounted in the arch formed by the mandrel 13 is a pressure member 16 which preferably comprises the segmental rim 17 and connecting bar 18, the connecting bar being provided adjacent its ends with depending lugs 19 adapted to slide in sockets 20 formed in bar 11 for the purpose of guiding the rim 17 when moved upwardly or downwardly.

The connecting bar 18 of pressure member 16 is provided with a centrally disposed aperture 21, and the bar 11 is provided with an aperture 22, and through these apertures is passed a bolt 23, the head 24 thereof being socketed in a recess 25 formed in bar 11, of approximately the same shape as said head, in order that the said bolt will be prevented from turning. Interposed between the bars 18 and 11 and surrounding bolt 23 is a spring 26' which serves to normally hold the segmental rim 17 adjacent the mandrel 13, and threaded on to said bolt is a nut 27 for the purpose of adjusting the pressure member.

The foregoing described construction is old in the art and forms no specific part of my invention which contemplates an improvement on the same. In the old construction, however, the mandrel segment 13 and the rim segment 17 are of a length equal to slightly over one-sixth of the circumference, while in my construction (as shown) these elements are of a length of slightly over one-third of the circumference.

In the operation of the old apparatus as described, the old tire carcass 26 is first stripped of all of the worn rubber and thoroughly cleaned. It is then placed on the mandrel, a sheet or layer of gum 28 is then cemented to the surface of the carcass, the retread 29 being cemented to the layer of gum. A tape binder is then wound around the retread and the segmental rim 17. The segmental rim is then drawn downwardly by an adjustment of the nut 27, thus tightening the tape and holding the retread tightly in contact with the gum and carcass. Steam is then admitted into the mandrel for a sufficient length of time to vulcanize the retread to the carcass. This operation has to be performed six times in order to complete the vulcanization of the entire retread, for the reason that a segmental rim of greater circular length would not pull evenly on the tape binder to give an equal pressure on the retread.

My invention as stated before contemplates the provision of means whereby only three vulcanizing operations will be necessary to complete the retreading of the entire casing carcass, and comprises the oppositely disposed auxiliary pressure members or lever arms 30 which are pivoted to the segmental rim 17 by means of the pins 31, the free ends of said lever arms extending outwardly and being bifurcated to form two arms which straddle the bar 18, as more clearly shown in Figs. 2 and 5 of the drawings.

The lever arms 30 are channel shaped, the side walls of said channels being adapted to straddle the rim 17 and the bottom or connecting wall being adapted to normally rest closely adjacent the inner peripheral surface of the rim. Each of the lever arms 30 is provided with lugs 32 having perforations provided therein for the reception of the hooked ends 33 of the inwardly projecting rods 34, the oppositely disposed ends of the rods being provided with right and left handed threads which are engaged by a turnbuckle 35 for operating the lever arms.

By the above described construction it will be obvious that the binding tape 36 may be wound around the segmental rim 17 at its center and around the lever arms 30 disposed at the ends of said rim.

After the binding tape 36 has been wound around the segmental rim and lever arms as described, the nut 27 is adjusted to draw the rim 17 inwardly and the turnbuckle 35 is rotated to draw the lever arms 30 inwardly towards each other to compensate for the shorter distance of movement of the segmental rim at its extremities. Thus it will be seen that the tape binding 36 will exert an even and uniform pressure on the retread through the entire length of the hollow mandrel, which is approximately one-third of the circumference of the retread.

What I claim is:

1. A vulcanizing apparatus, comprising a segmental mandrel, a pressure exerting device mounted adjacent the inner peripheral surface of said mandrel, means for moving said pressure exerting device in an approximately uniform manner with respect to the outer peripheral surface of said mandrel towards the axis thereof, and auxiliary pressure devices connected to said first named pressure device adapted to be operated independently of said first named device, whereby to exert in conjunction with said first named device an even and uniform pressure on a retread throughout the entire length of the segmental mandrel.

2. A vulcanizing apparatus, comprising a segmental metallic mandrel, a pressure exerting member mounted adjacent said mandrel, auxiliary pressure members pivotally mounted thereon, and means for operating said pivoted pressure members.

3. A vulcanizing apparatus, comprising a segmental mandrel, a segmental pressure exerting member mounted adjacent said segmental mandrel, a pair of oppositely disposed pressure exerting members mounted on and adjacent the ends of said segmental pressure member, means for operating said segmental pressure member, and means for operating said oppositely disposed pressure members.

4. A vulcanizing apparatus, comprising a segmental mandrel, a segmental pressure exerting member mounted adjacent said segmental mandrel, a pair of oppositely disposed lever arms pivoted on said segmental pressure member adjacent the ends thereof, means for moving said segmental pressure member toward and from the axis thereof, and means connecting said lever arms together for moving them in unison on their pivots.

In witness that I claim the foregoing I have hereunto subscribed my name this 16th day of December, 1921.

GEO. W. ENO.